(12) United States Patent
Hayashi

(10) Patent No.: US 7,919,721 B2
(45) Date of Patent: Apr. 5, 2011

(54) METHOD OF MEASURING TAPER ANGLE IN WIRE ELECTRIC DISCHARGE MACHINING APPARATUS AND MEASURING TOOL

(75) Inventor: Yasushi Hayashi, San Jose, CA (US)

(73) Assignee: Sodick Co., Ltd., Yokohama, Kanagawa (JP)

( * ) Notice: Subject to any disclaimer, the term of this patent is extended or adjusted under 35 U.S.C. 154(b) by 650 days.

(21) Appl. No.: 11/881,310

(22) Filed: Jul. 25, 2007

(65) Prior Publication Data

US 2008/0047936 A1    Feb. 28, 2008

(30) Foreign Application Priority Data

Jul. 27, 2006   (JP) .................. 2006-204728

(51) Int. Cl.
*B23H 7/10*        (2006.01)
(52) U.S. Cl. .................................. 219/69.12
(58) Field of Classification Search .............. 219/69.12; 700/162; 33/502
See application file for complete search history.

(56) References Cited

U.S. PATENT DOCUMENTS

| | | | |
|---|---|---|---|
| 4,736,086 A | | 4/1988 | Obara |
| 4,931,614 A | * | 6/1990 | Sumita ............... 219/69.12 |
| 6,836,741 B2 | | 12/2004 | Liang et al. |
| 7,294,806 B2 | * | 11/2007 | Martin et al. ........ 219/69.12 |

FOREIGN PATENT DOCUMENTS

| | | | |
|---|---|---|---|
| JP | U 62-088529 | | 6/1987 |
| JP | 63-139617 A | * | 6/1988 |
| JP | 63-191516 A | * | 8/1988 |
| JP | 1-193126 A | * | 8/1989 |
| JP | U 3-103119 | | 10/1991 |
| JP | 5-337745 A | * | 12/1993 |
| JP | A 06-015529 | | 1/1994 |
| JP | 8-323546 A | * | 12/1996 |

* cited by examiner

*Primary Examiner* — Geoffrey S Evans
(74) *Attorney, Agent, or Firm* — McDermott Will & Emery LLP

(57) ABSTRACT

A method of measuring a taper angle in a wire electric discharge machining apparatus comprises, the steps of: providing a measuring tool (2) having lower and upper edges (27, 23) being spaced by a given height (H); moving a vertical wire electrode (EV) from a reference position (R) in one direction by a first distance (X1) to the lower edge (27); moving the vertical wire electrode from the reference position in the one direction by a second distance (X2) to the upper edge (23); moving an inclined wire electrode (EI) from the reference position in the one direction by a third distance (X3) to the lower edge; moving the inclined wire electrode from the reference position in the one direction by a fourth distance (X4) to the upper edge; and calculating a taper angle (θ) of the inclined wire electrode based on the following equation:

$$\theta = \tan^{-1} \gamma/H$$

$$\gamma = |(X3-X1) - (X4-X2)|.$$

8 Claims, 2 Drawing Sheets

Prior Art

METHOD OF MEASURING TAPER ANGLE IN WIRE ELECTRIC DISCHARGE MACHINING APPARATUS AND MEASURING TOOL

BACKGROUND OF THE INVENTION

1. Field of the Invention

The present invention relates to a wire electric discharge machining apparatus in which a wire electrode is vertically supported under tension between upper and lower wire guides. In particular, the present invention relates to a method of measuring a taper angle of the wire electrode.

2. Description of the Related Art

A wire electric discharge machining apparatus is widely known which cuts a plate-like workpiece in a manner analogous to a band saw by supplying a series of current pulses to a moving wire electrode. Taper cut is known as cutting using a wire electrode which is inclined by an instructed taper angle by moving one of the wire guides relative to the other in a horizontal XY plane.

Japanese Laid-open utility model application 3-103119 discloses a method of measuring a taper angle of wire electrode with a measuring tool. As illustrated in FIG. 1A, a measuring tool 1 is conventionally used to measure a taper angle of wire electrode. The measuring tool 1 is made of conductive material and includes a rectangular body 10 and two parallel arms 12 and 16. The arms 12 and 16 extend longitudinally from one side of the rectangular body 10 and have respective sharp edges 13 and 17. The sharp edges 13 and 17 extend longitudinally and parallel and are vertically spaced by a given height H. The bottom of the measuring tool 1 includes the lower edge 17. The upper and lower sharp edges 13 and 17 are laterally spaced and face each other.

A conventional method of measuring a taper angle will now be described with reference to FIGS. 1A and 1B.

The measuring tool 1 is positioned on an XY table T so that the edges 13 and 17 extend in the direction of Y-axis. The XY table T is moveable in the directions of orthogonal X and Y axes. A wire electrode can be moved within an XY plane relative to the measuring tool 1 by movement of the XY table T.

A wire electrode is aligned vertically to an XY plane between upper and lower wire guides GU and GL. The upper wire guide GU is moveable in the directions of orthogonal U and V axes. The U-axis is parallel to the X-axis and the V-axis is parallel to the Y-axis. The vertical wire electrode is positioned at a reference position R between the sharp edges 13 and 17 by movement of the XY table T. Coordinates (x, y) of the reference position R are stored.

The vertical wire electrode EV is moved in a negative X-axis direction. At step S1, when electrical contact between the wire electrode EV and the upper sharp edge 13 is detected, the XY table T is stopped and a first X-axis distance X1 is stored. The wire electrode EV is returned to the reference position R.

The wire electrode EV is moved in a positive X-axis direction. At step S2, when electrical contact between the wire electrode EV and the lower sharp edge 17 is detected, the XY table T is stopped and a second X-axis distance X2 is stored. The wire electrode EV is returned to the reference position R.

The wire electrode is inclined at an instructed taper angle θ by moving the upper wire guide GU in a positive U-axis direction. A U-axis distance U of the upper wire guide GU is stored.

The inclined wire electrode EI is moved in a negative X-axis direction. At step S3, when electrical contact between the wire electrode EI and the upper sharp edge 13 is detected, the XY table T is stopped and a third X-axis distance X3 is stored. The wire electrode EV is returned to the reference position R.

The wire electrode EI is moved in a positive X-axis direction. At step S4, when electrical contact between the wire electrode EI and the lower sharp edge 17 is detected, the XY table T is stopped and a fourth X-axis distance X4 is stored.

A taper angle θ is expressed by an equation (1):

$$\theta = \tan^{-1} \gamma/H \quad (1)$$

γ is expressed by an equation (2):

$$\gamma = \alpha - \beta \quad (2)$$

α and β are expressed by equations (3) and (4), respectively:

$$\alpha = |(X3 + R/\cos\theta) - (X1 + R)| \quad (3)$$

$$\beta = |(X2 + R) - (X4 + R/\cos\theta)| \quad (4)$$

R is a radius of wire electrode. Based on the equations (2), (3) and (4), γ is expressed by an equation (5):

$$\gamma = (|X3| + |X4|) - (|X1| + |X2|) + 2R(1/\cos\theta - 1) \quad (5)$$

The value γ may be inaccurate as the equation (5) includes taper angle θ of which actual value has not been obtained.

SUMMARY OF THE INVENTION

An object of the present invention is to provide a method of accurately measuring a taper angle of wire electrode.

Another object of the present invention is to provide a measuring tool for accurately measuring a taper angle of wire electrode.

According to one aspect of the present invention, a method of measuring a taper angle in a wire electric discharge machining apparatus comprises, the steps of:

(a) providing a measuring tool (2) having lower and upper edges (27, 23) being spaced by a given height (H);

(b) aligning a wire electrode vertically between a pair of wire guides (GL, GU);

(c) moving the vertical wire electrode (EV) from a reference position (R) in one direction by a first distance (X1) until contact between the wire electrode and the lower edge (27) is detected;

(d) moving the vertical wire electrode from the reference position in the one direction by a second distance (X2) until contact between the wire electrode and the upper edge (23) is detected;

(e) inclining the wire electrode at a taper angle (θ);

(f) moving the inclined wire electrode (EI) from the reference position in the one direction by a third distance (X3) until contact between the wire electrode and the lower edge is detected;

(g) moving the inclined wire electrode from the reference position in the one direction by a fourth distance (X4) until contact between the wire electrode and the upper edge is detected; and (h) calculating the taper angle based on the first, second, third and fourth distances and the given height.

The taper angle θ may be calculated by the following equation:

$$\theta = \tan^{-1} \gamma/H$$

$$\gamma = |(X3 - X1) - (X4 - X2)|.$$

According to another aspect of the present invention, a measuring tool for measuring a taper angle in a wire electric discharge machining apparatus comprises:

a rectangular body (20);

a lower arm (26) extending from one side of the rectangular body, having a lower sharp edge (27);

an upper arm (22) extending from one side of the rectangular body and having an upper sharp edge (23); and wherein the upper and lower sharp edges face the same direction.

Preferably, the upper arm is longer than the lower arm.

It is preferable that the upper and lower sharp edges extend parallel and longitudinally and are vertically and laterally spaced.

PREFERRED EMBODIMENT OF THE INVENTION

Figure 1A:
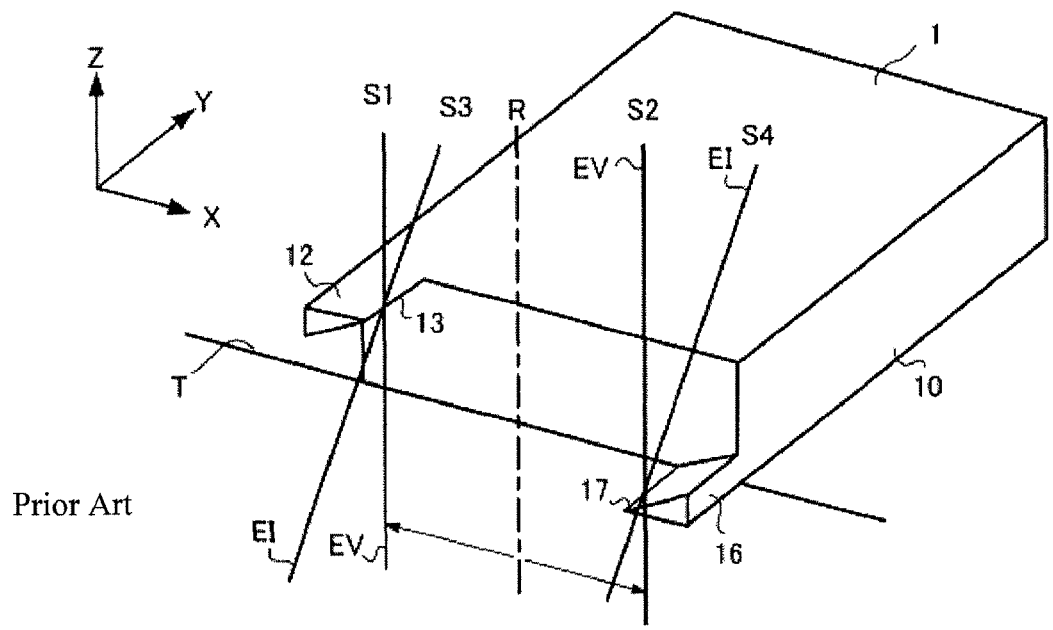
FIG. 1A is a perspective view illustrating a conventional measuring tool.
Figure 1B:
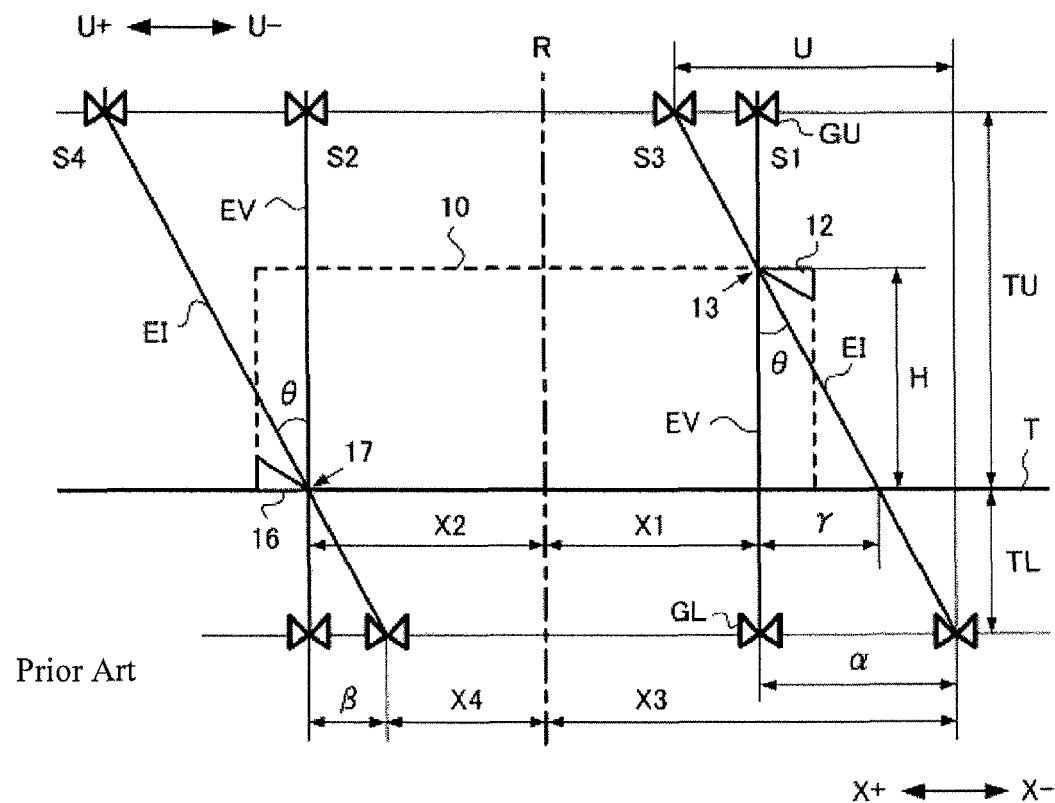
FIG. 1B illustrates a conventional method of measuring a taper angle of wire electrode with the measuring tool of FIG. 1A.

A method of measuring a taper angle of wire electrode according to the present invention will now be described with reference to FIGS. 2A and 2B. The similar elements are labeled with similar reference numerals as used in FIGS. 1A and 1B.

Figure 2A:
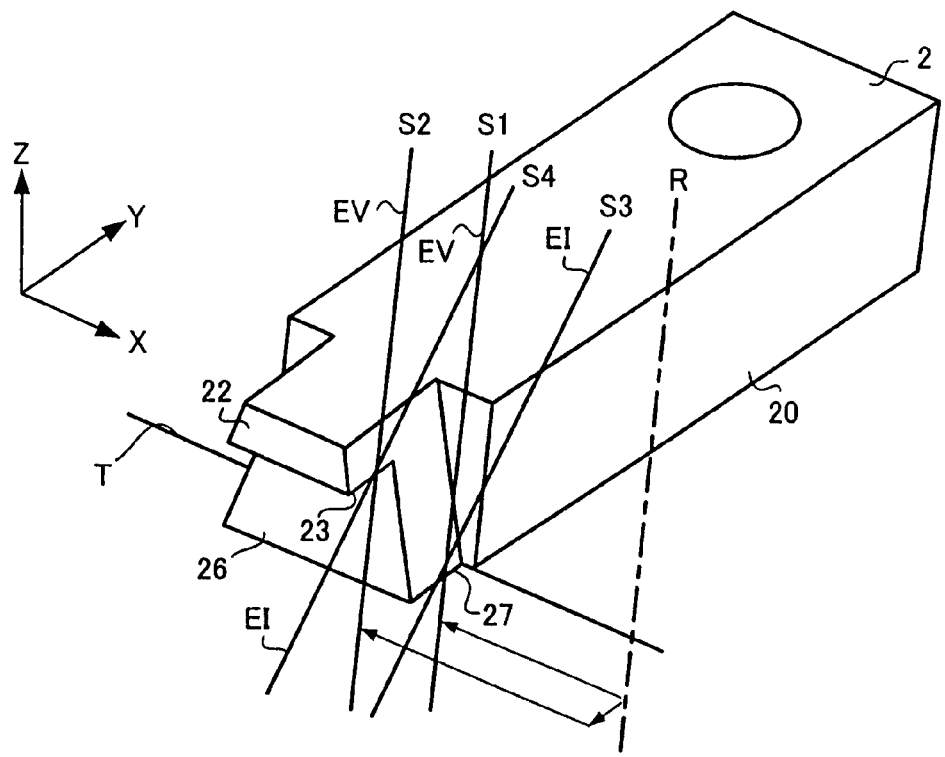
FIG. 2A is a perspective view illustrating a measuring tool of the present invention.

As illustrated in FIG. 2A, a measuring tool 2 which is made of conductive material and includes a rectangular body 20 and two arms 22 and 26 is provided. The arms 22 and 26 extend longitudinally from one side of the rectangular body 20 and have respective sharp edges 23 and 27. The arms 22 and 26 have different lengths and widths. In the illustrated embodiment, the upper arm 22 is longer and narrower than the lower arm 26. The sharp edges 23 and 27 extend parallel and longitudinally of the measuring tool 2. The sharp edges 23 and 27 are vertically spaced by a given height H. The sharp edges 23 and 27 have the same angle and face the same direction, i.e. a positive X-axis direction. The sharp edges 23 and 27 are laterally spaced. The bottom of the measuring tool 2 includes the lower edge 27.

The measuring tool 2 is positioned on an XY table T so that the edges 23 and 27 extend in the direction of Y-axis. A wire electrode is aligned vertically to the XY plane between a pair of wire guides GU and GL. The upper wire guide GU is moveable in the directions of orthogonal U and V axes. The vertical wire electrode is positioned at a reference position R so as to face the lower sharp edge 27. Coordinates (x, y) of the reference position R are stored.

The vertical wire electrode EV is moved in a negative X-axis direction by a first X-axis distance X1 until electrical contact between the wire electrode EV and the lower sharp edge 27 is detected, at step S1. The first X-axis distance X1 is stored and the wire electrode EV is returned to the reference position R.

The wire electrode EV is slightly moved in a negative Y-axis direction so as to face the upper sharp edge 23. The wire electrode EV is further moved in a negative X-axis direction by a second X-axis distance X2 until electrical contact between the wire electrode EV and the upper sharp edge 23 is detected, at step S2. The second X-axis distance X2 is stored and the wire electrode EV is returned to the reference position R.

The wire electrode is inclined at an instructed taper angle θ by moving the upper wire guide GU in a positive U-axis direction. A U-axis distance U of the upper wire guide GU is stored.

The inclined wire electrode EI is moved in a negative X-axis direction by a third X-axis distance X3 until electrical contact between the wire electrode EI and the lower sharp edge 27 is detected, at step S3. The third X-axis distance X3 is stored and the wire electrode EV is returned to the reference position R.

Figure 2B:
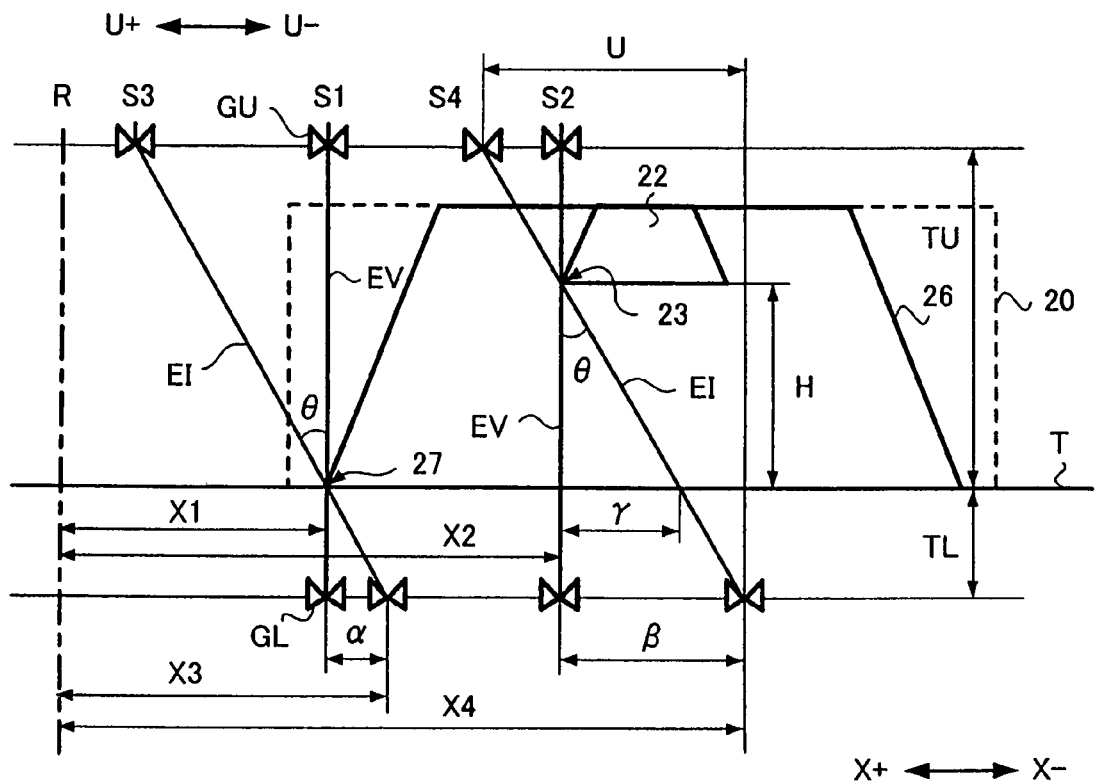
FIG. 2B illustrates a method of measuring a taper angle of wire electrode with the measuring tool of FIG. 2A according to the present invention.

The wire electrode EI is slightly moved in a negative Y-axis direction so as to face the upper sharp edge 23. The wire electrode EI is further moved in a negative X-axis direction by a fourth X-axis distance X4, until electrical contact between the wire electrode EI and the upper sharp edge 23 is detected, at step S4. The fourth X-axis distance X4 is stored.

α and β in FIG. 2B are expressed by equations (6) and (7), respectively:

$$\alpha = |(X3 + R/\cos\theta) - (X1 + R)| \quad (6)$$

$$\beta = |(X4 + R/\cos\theta) - (X2 + R)| \quad (7)$$

Based on the equations (2), (6) and (7), γ is expressed by an equation (8):

$$\gamma = |(X3 - X1) - (X4 - X2)| \quad (8)$$

Taper angle θ can be accurately calculated on the equation (1) as the equation (8) includes only measured values X1, X2, X3 and X4.

It is essential to accurately set a distance TL between the table T and a turning point in the lower wire guide GL and a distance TU between the table T and another turning point in the upper wire guide GU. Those turning points, where the taper angle of wire electrode is actually formed, deviate from nominal values depending on the taper angle θ. TL and TU can be calculated by equations (9) and (10), respectively:

$$TL = \alpha \times \gamma / H \quad (9)$$

$$TU = (U - \alpha) \times \gamma / H \quad (10)$$

The present invention is not intended to be limited to the disclosed form. It is clear that many improvements and variations are possible with reference to the above description. The illustrated embodiment was selected to explain the essence and practical application of the invention. The scope of the invention is defined by the attached claims.

The invention claimed is:

1. A method of measuring a taper angle in a wire electric discharge machining apparatus comprising, the steps of:

providing a measuring tool having lower and upper edges being spaced by a given height;

aligning a wire electrode vertically between a pair of wire guides;

moving the vertical wire electrode from a reference position in one direction by a first distance until contact between the wire electrode and the lower edge is detected;

moving the vertical wire electrode from the reference position in the one direction by a second distance until contact between the wire electrode and the upper edge is detected;

inclining the wire electrode at a taper angle;

moving the inclined wire electrode from the reference position in the one direction by a third distance until contact between the wire electrode and the lower edge is detected;

moving the inclined wire electrode from the reference position in the one direction by a fourth distance until contact between the wire electrode and the upper edge is detected; and calculating the taper angle based on the first, second, third and fourth distances and the given height.

2. The method of claim 1, wherein the calculating includes calculating the taper angle θ by the following equation:

$$\theta = \tan^{-1} \gamma/H,$$

wherein $\gamma = |(X3-X1)-(X4-X2)|$, and wherein H represents the given height and X1, X2, X3 and X4 represent the first, second, third and fourth distances, respectively.

3. A measuring tool for measuring a taper angle in a wire electric discharge machining apparatus comprising:

a rectangular body;

a lower arm extending from a side of the rectangular body and having a lower sharp edge; and an upper arm extending from the side of the rectangular body and having an upper sharp edge, wherein the upper and lower sharp edges face the same direction, and wherein the upper arm is longer than the lower arm.

4. A measuring tool for measuring a taper angle in a wire electric discharge machining apparatus comprising:

a rectangular body;

a lower arm extending from a side of the rectangular body and having a lower sharp edge; and an upper arm extending from the side of the rectangular body and having an upper sharp edge, wherein the upper and lower sharp edges face the same direction, and wherein one of the upper and lower arms is longer than the other.

5. The measuring tool of claim 4, wherein the upper and lower sharp edges extend in a parallel manner.

6. The measuring tool of claim 4, wherein the upper and lower sharp edges extend longitudinally and are vertically and laterally spaced.

7. The measuring tool of claim 4, wherein the upper and lower sharp edges have the same angle.

8. The measuring tool of claim 4, wherein the bottom of the measuring tool includes the lower sharp edge.

* * * * *